United States Patent

Harper

Patent Number: 5,486,037
Date of Patent: Jan. 23, 1996

[54] INFANT HEADREST FOR CHILD SAFETY SEAT

[75] Inventor: Marge Harper, Littleton, Colo.

[73] Assignee: Century Products Company, Macedonia, Ohio

[21] Appl. No.: 334,520

[22] Filed: Nov. 4, 1994

[51] Int. Cl.$^6$ .................................................. A47C 7/38
[52] U.S. Cl. ...................... 297/397; 297/219.12; 297/484
[58] Field of Search ........................... 297/219.12, 230.1, 297/397, 452.35, 464, 485, DIG. 6; 5/636–638, 652, 653, 655

[56] References Cited

U.S. PATENT DOCUMENTS

| 4,434,513 | 3/1984 | Welch . | |
|---|---|---|---|
| 4,617,691 | 10/1986 | Monti et al. | 5/636 X |
| 4,738,488 | 4/1988 | Camelio . | |
| 4,776,049 | 10/1988 | Perron | 5/636 X |
| 4,779,930 | 10/1988 | Rosen . | |
| 5,108,152 | 4/1992 | Reilly et al. | 297/397 X |
| 5,220,700 | 6/1993 | Liu . | |
| 5,310,245 | 5/1994 | Lyszczasz | 297/397 X |
| 5,339,472 | 8/1994 | Yin | 5/636 |
| 5,383,711 | 1/1995 | Houghteling | 297/397 |

*Primary Examiner*—Peter R. Brown
*Attorney, Agent, or Firm*—Graham & James

[57] ABSTRACT

An infant headrest configured to attach to automobile restraint shoulder belts while the belts are operationally employed about an infant carrier, having a recloseable opening formed from a pair of hook and pile secured flaps through which the shoulder belts pass, and a recess portion on the underside of the headrest to house the shoulder belts. A plurality of semi-rigid cushion portions straddle the shoulder belts. The headrest may be made of two fabric portions hemmed together, with the front portion being of a decorative pattern.

7 Claims, 1 Drawing Sheet

INFANT HEADREST FOR CHILD SAFETY SEAT

BACKGROUND OF THE INVENTION

This invention relates to a headrest or head support for a child in a car seat or infant carrier.

SUMMARY OF THE INVENTION

The present invention is intended to provide an improved headrest pillow that is adapted to be used with automobile restraint shoulder belts. The improved headrest has a Velcro™ strap fastener (or, more generically, a "hook and pile" fastener) about which auto restraint shoulder belts may be held by the headrest, a tapered, triangular recess region underneath the head rest area through which the shoulder belts pass, and a pair of generally triangular in cross-section, oblong, semi-rigid pillows to support the headrest.

DETAILED DESCRIPTION OF THE PREFERRED EMBODIMENTS

Figure 2:
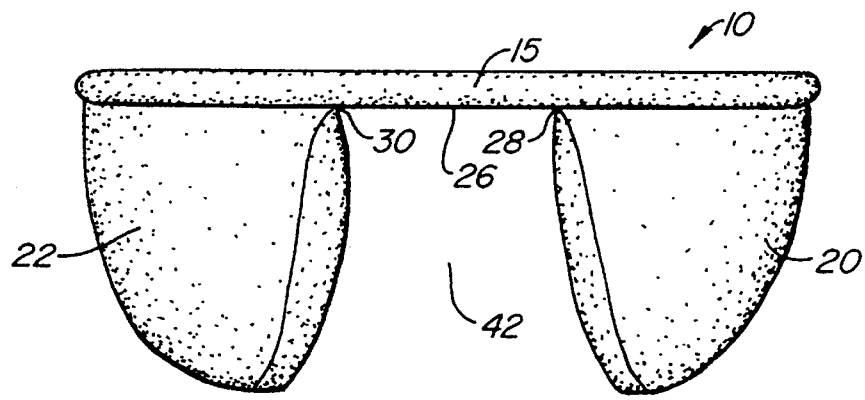
FIG. 2 shows a top view of the headrest pillow.
Figure 1:
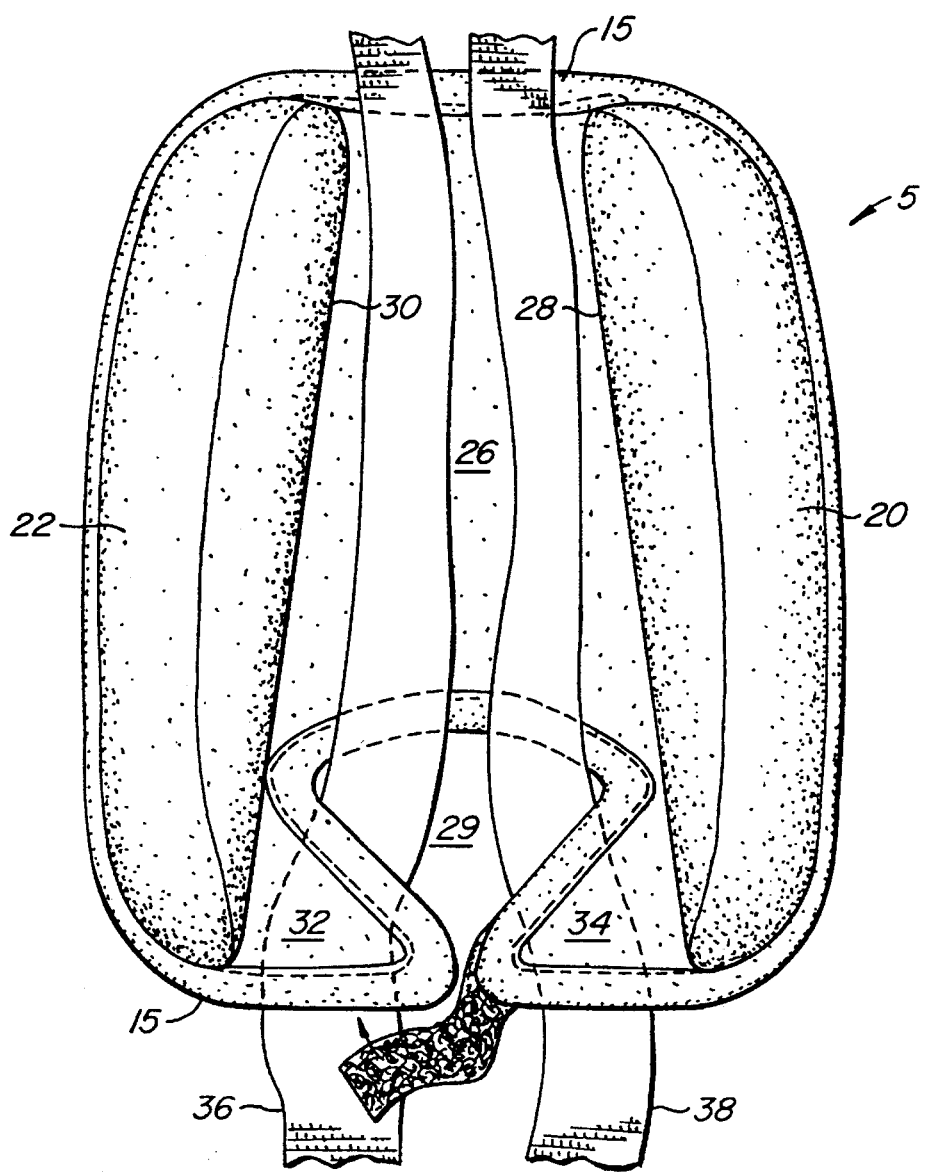
FIG. 1 shows a back view of the headrest pillow, engaging automobile shoulder belts.

Referring to the figures, there is shown a multi-ply fabric headrest or pillow 5, made of one or more plies of a generally plush fabric of the kind used in automobile upholstery. The fabric used may be multilayered or single layered, and one or more fabric portions may be padded. The headrest has a hem 15 extending about its outer edges as shown, with a front panel forming the front of the headrest, and a back panel forming the back of the headrest as shown in FIG. 1, with the hem 15 joining the two panels of fabric together. The front panel may be a decorative fabric, while the back portion may be a padded fabric. The headrest can generally be divided into three sections, with two outer sections forming substantially rigid pillow sections 20, 22 and an intermediate section 26, forming a generally wedge shaped or triangular connecting portion. FIG. 2 shows the front view of the headrest at reference arrow 10, with the pillows 20, 22 on the back of the headrest along with recess 42. The pillow sections are filled or house a resilient cushion or foam material. Seams 28, 30 divide the fabric into the three sections. A pair of flaps 32, 34 form a recloseable loop region through which automobile restraint shoulder belts pass as shown, over the flaps and then under the opening 29 to lie under intermediate section 26. In this way the headrest engages the shoulder belts. Referring to FIG. 2, the shoulder belts would pass through the middle of the pillow, and be contained in recess 42 at the back of the headrest, which runs the longitudinal length of the headrest as shown, which forms a generally tapered channel in front view to accommodate the spread of the shoulder belts, as suggested by seams 28, 30 in FIG. 1.

Flaps 32, 34 are closed with a Velcro™ fastener, or more generally a hook and pile fastener, mechanical fastener, any other equivalent means for closing or securing these flaps together to surround the automobile shoulder belts.

In operation the headrest would be positioned about the shoulder belts by opening and closing the Velcro™ fasteners and allowing the shoulder belts to pass over the flaps and then under intermediate section 26, as suggested by the dashed lines in FIG. 1, so that an infant would rest its head on the front part of the headrest, the flat, planar portion as shown in FIG. 2, preferably while the infant was in an infant carrier or child safety seat. The shoulder belts 36, 38 as shown passing through in FIG. 1 would pass over the infant's torso in a conventional operating manner.

While in the preferred embodiment a pair of cushion regions are shown connected by an intermediate fabric portion, in general any number of cushions or a single cushion may be employed, provided a recloseable portion is provided through which auto restraint shoulder belts may pass.

The foregoing description is offered for illustrative purposes only. Numerous modifications and variations may be readily apparent to those skilled in the art, while still falling within the spirit and scope of the invention as claimed herein below.

What is claimed is:

1. An infant headrest support for automobiles comprising, in combination:

a pair of automobile shoulder belts;

a headrest comprising a front portion for engaging an infant's head, said front portion being substantially flat and planar, and a back portion, said back portion having a pair of pillow sections spaced apart from one another and extending along the length of said headrest to form a recess running the length of said headrest along said back portion, and a pair of flaps;

an opening in said headrest, said flaps allowing access to said opening, said automobile shoulder belts passing through said opening, behind said front portion and passing through said recess formed between said pillow sections in said back portion;

wherein said flaps are selectively opened and secured to allow access to said opening by said shoulder belts, in order to secure said pair of automobile shoulder belts to said headrest.

2. The invention according to claim 1, wherein said headrest is formed of a pair of fabric panels, with a first fabric panel forming said front portion and a second fabric panel forming said back portion, said front and back panels joined at their peripheral edges with a hem.

3. The invention according to claim 2, wherein said first fabric panel is a decorative fabric, and said second fabric panel is a padded fabric, and said pillow sections house a substantially rigid resilient material.

4. The invention according to claim 1, wherein said flaps are selectively secured together with a hook and pile fastener.

5. The invention according to claim 4, wherein said longitudinally extending recess formed by said pillow sections is a substantially tapered triangular channel, to accommodate said pair of automobile shoulder belts as said shoulder belts run the length of said recess.

6. The invention according to claim 4, wherein said headrest is formed of a pair of fabric panels, with a first fabric panel forming said front portion and a second fabric panel forming said back portion, said front and back panels joined at their peripheral edges with a hem, and said pillow sections house a resilient material.

7. The invention according to claim 1, further comprising, in combination, an infant carrier secured by said automobile shoulder belts.

* * * * *